ём

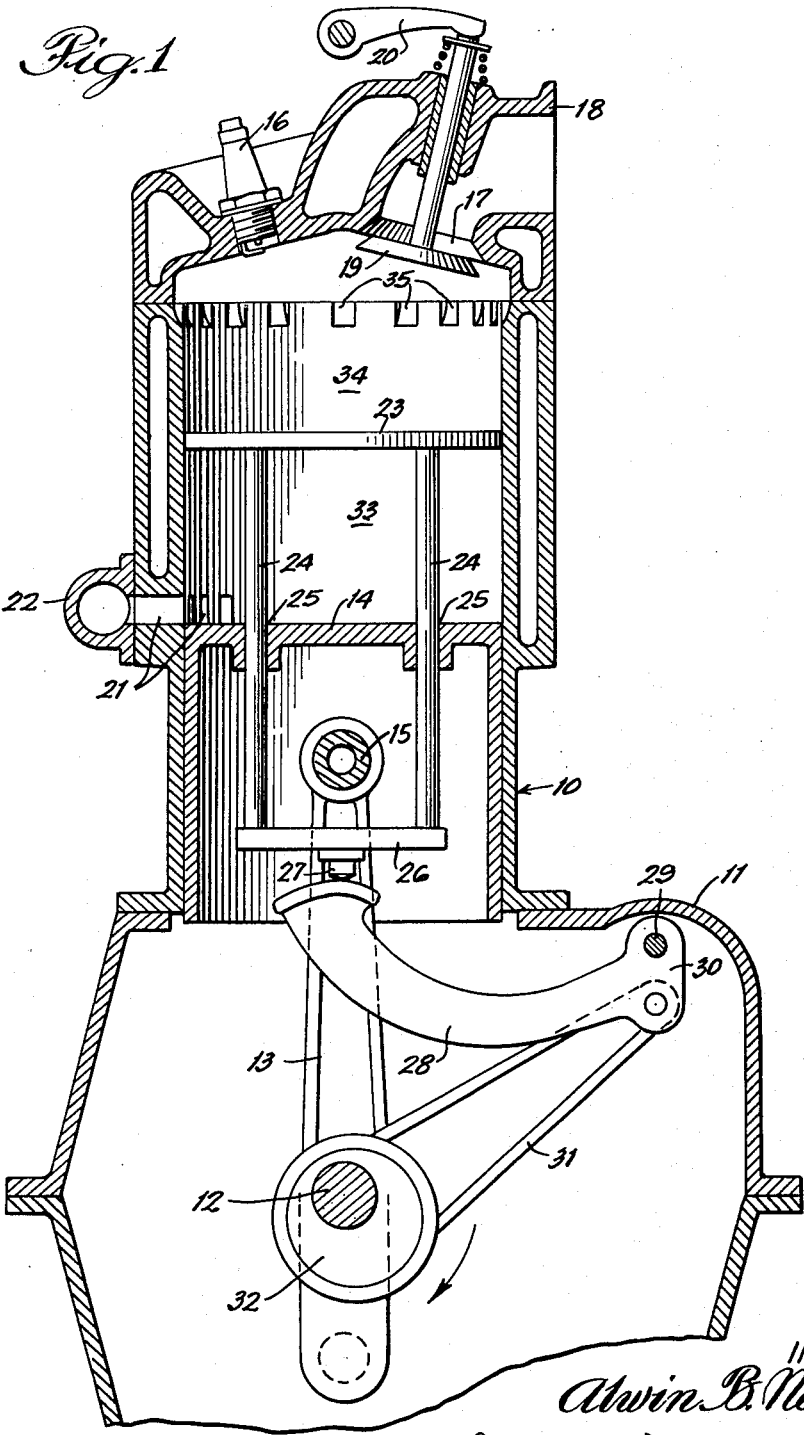

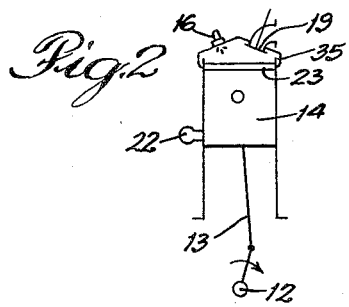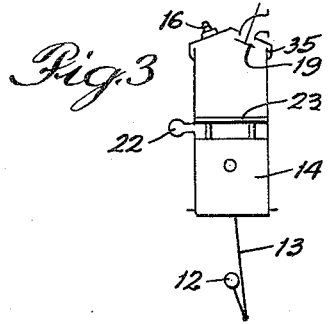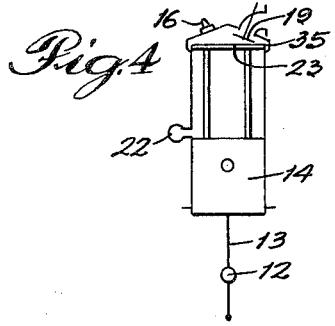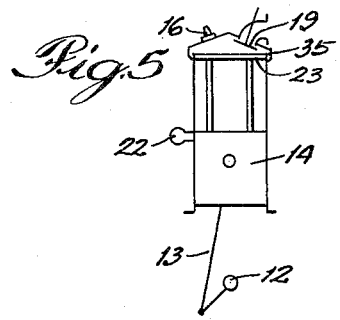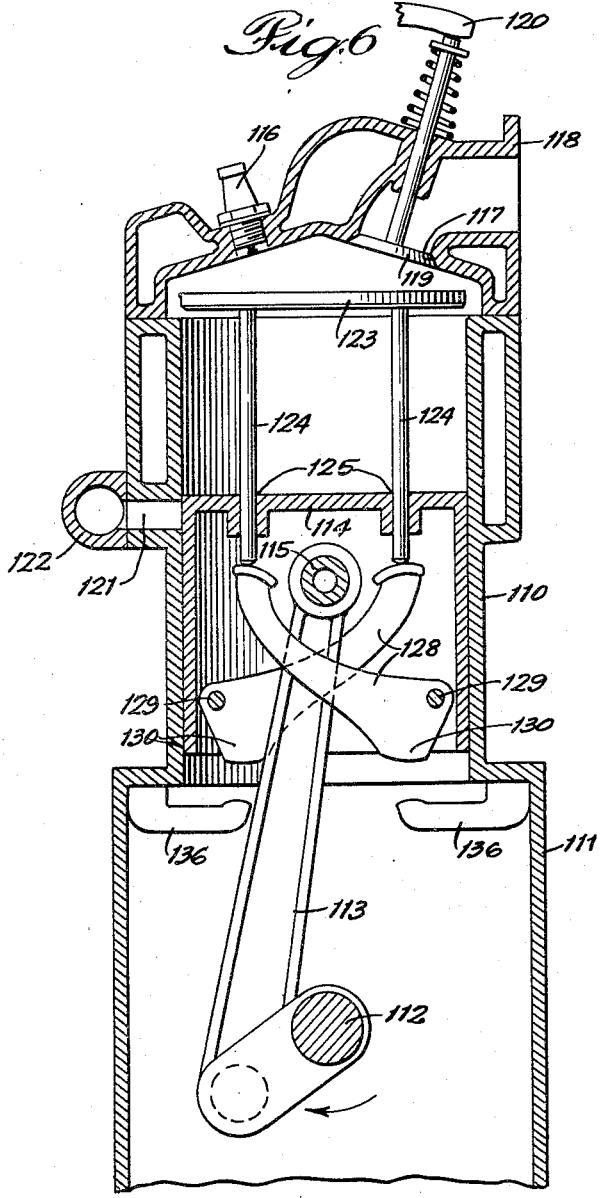

United States Patent Office 2,962,010
Patented Nov. 29, 1960

2,962,010

INTERNAL COMBUSTION ENGINE

Alwin B. Newton, Wichita, Kans.
(850 Clubhouse Road, York, Pa.)

Filed Sept. 2, 1958, Ser. No. 758,460

2 Claims. (Cl. 123—66)

This invention relates to an internal combustion engine, and more particularly, to an internal combustion engine having a two-stroke cycle.

It is an object of this invention to provide a novel two-stroke cycle internal combustion engine. Another object is to provide an internal combustion engine having a piston-equipped cylinder in which means are provided for simultaneously admitting and exhausting fuel. Still another object is to provide in a piston-equipped cylinder a plate-like piston movable independently of the piston and interposed between the piston and an end of the cylinder equipped with an exhaust valve. Yet another object is to provide means for moving the plate-like piston in the cylinder just above described only during the portion of the cycle in which the main piston uncovers an intake port provided in the cylinder side wall. Other objects and advantages of this invention can be seen as this specification proceeds.

This invention will be explained in conjunction with the accompanying drawing, in which—

Fig. 1 is a fragmentary elevational view partially in section of an internal combustion engine incorporating teachings of this invention;

Figs. 2–5 are schematic views of a piston-equipped cylinder in various stages of a cycle of operation, as would occur according to the teachings of the invention; and Fig. 6 is a view similar to Fig. 1, but showing a modified form of the invention.

Referring now to the drawing, the numeral 10 designates generally a cylinder which may be one of several provided in an internal combustion engine. In accordance with conventional practice, the cylinder 10 communicates with a crankcase 11 which houses a crank shaft 12 in bearings not shown. The crank shaft 12 is pivotally connected, again in conventional fashion, to a piston rod 13 which is pivotally connected to a piston 14 through a wrist pin 15. Thus, the reciprocation of piston 14 provides the usual rotary motion of crank shaft 12.

The cylinder 10, at the upper end, is equipped with a sparkplug 16 and an exhaust port 17. The exhaust manifold 18 which communicates with exhaust port 17, supports an exhaust valve 19. The exhaust valve 19 is positioned through a valve operator 20 driven through conventional linkage (not shown) by a cam (also not shown) on the crankshaft 12. The cylinder 10 is equipped with an intake port 21 for fuel which communicates with an intake manifold 22. The intake port 21 is spaced from the top end of cylinder 10 and is adapted to be uncovered by piston 14 when piston 14 is at the bottom of its stroke.

Slidingly and sealingly mounted in cylinder 10 is a plate-like piston 23 which is equipped with a pair of depending guide members 24 which are slidingly and sealingly received in bores 25 in the top wall of piston 14. The guide members 24 are rigidly secured at the lower ends thereof by a connecting bar 26 which is equipped with a downwardly-extending projection 27. The projection 27 is engageable with a pivotally-mounted arm 28 supported as at 29 in the interior of crankcase 11. The arm 28 is also equipped with an ear 30 which is pivotally connected by means of a linkage 31 to crankshaft 12. One end of linkage 31 is provided with a bore to fit an eccentric 32 mounted on the crankshaft 12.

It is believed that the invention will be more clearly understood from a consideration of the operation of the apparatus just described, and such a description follows herewith.

*Operation*

As seen in Fig. 1, piston 14 is at the bottom dead center position, and the eccentric linkage 31 is raising the piston 23 by means of arm 28 and projection 27. In this operation, the plate-like piston 23 will rise to the top of the cylinder before the rising of piston 14 seals off the inlet port 21. The motion of the plate-like piston 23 fills the portion 33 of cylinder 10 with fresh fuel mixture, and simultaneously forces exhaust gases from the chamber portion 34 of cylinder 10 through the exhaust port 17. As the plate-like piston 23 rises to its uppermost position adjacent the top end of cylinder 10, it uncovers slots 35 in the side wall of cylinder 10. As the piston 14 rises, compressing the fuel charge after sealing inlet port 21, the compressed gas flows around plate-like piston 23 through the slots or recesses 35, purging exhaust gases from above the plate. Exhaust valve 19 then closes and the piston further compresses the charge, during which time the arm 28 is disengaged from projection 27—the plate 23 being held in place by the gases being compressed by piston 14. When the piston reaches top dead center, the piston 14 engages the underside of the plate-like piston 23 just prior to the firing of sparkplug 16. Thereafter, the plate-like piston 23 and the piston 14 ride down together until the piston 14 uncovers inlet port 21, and the linkage 31 causes the plate-like piston 23 to rise again.

The foregoing is depicted schematically in Figs. 2–5. Fig. 2 shows the condition of the plate-like piston 23 when it is contacting the main piston 14 after compression has taken place, and at the moment of the firing of sparkplug 16. At this time, of course, exhaust valve 19 is closed.

Under the influence of the exploding charge, the plate-like piston 23 and the main piston 14 are moved downwardly to the position seen in Fig. 3. At this point, plate-like piston 23 is just beginning to rise, with piston 14 being below the inlet port 21.

In Fig. 4, as in Fig. 3, the exhaust valve 19 is open, with the plate-like piston 23 approaching the top of its stroke while piston 14 is still below intake port 21.

In Fig. 5, the compression stroke of piston 14 is beginning, with exhaust valve 19 being closed and plate-like piston 23 being at its uppermost position and aligned with recesses 35 to permit the bypass of fuel around the plate-like piston 23.

By making the arm 28 responsive to the crank shaft 12, which in turn is responsive to the movement of piston 14, the plate-like piston 23 can be caused to rise during virtually the entire time that intake port 21 is uncovered by piston 14. Should it be desired to provide for a quicker exhaust of the exhaust vapors from the cylinder, this can be readily achieved through the modification of the invention seen in Fig. 6. In Fig. 6, the numbering system employed follows that of Fig. 1, but with the addition of 100 to numerals for similar elements.

Thus, in Fig. 6 the numeral 110 designates a cylinder, 111 the crankcase, 112 the crank shaft, 113 the piston rod, 114 the piston, and 115 the piston wrist pin.

Also following the arrangement in Fig. 1, the numeral 116 in Fig. 6 designates a sparkplug, the numeral 117 the top exhaust port, the numeral 118 the exhaust manifold, the numeral 119 the exhaust valve, and the numeral 120 the exhaust valve actuator. The numerals 121 and 122 refer respectively to an intake port and an intake manifold. Still further, the numeral 123 refers to a plate that is in effect a thin piston, being slidingly and sealingly mounted within cylinder 110. Plate 123 is equipped with guide members 124 which are slidingly and sealingly received in bores 125 in the top wall of piston 114. The guide members 124 are engaged by arm members 128 which are pivotally mounted, as at 129, within piston 114. The arms 128 are equipped with downwardly extending projections 130 which engage lugs 136 rigidly secured within crankcase 111.

In the operation of the form of the invention seen in Fig. 6, during the downward movement of piston 114, the projections 130 of arms 128 engage lugs 136 and thereupon rapidly force plate 123 into its top position, scavenging the exhaust vapors from cylinder 110. In contrast to the apparatus seen in Fig. 1, the scavenging operation is achieved entirely during the downward movement of piston 114 in uncovering intake port 121. In the form seen in Fig. 1, the scavenging operation is performed during both the downward movement of piston 14 in uncovering port 21 and the subsequent upward movement when it recovers port 21.

While in the foregoing specification, a detailed description of the invention has been given for the sake of clearly teaching the invention, it will be readily apparent to those skilled in the art that many variations in the details thereof may be made without departing from the spirit and scope of the invention.

I claim:

1. An internal combustion engine, comprising a cylinder, a crankshaft, a piston reciprocable in said cylinder and connected to said crankshaft, said cylinder having an exhaust valve therein at the end thereof remote from said crankshaft with a fuel intake port in the side wall thereof spaced from said end, a plate reciprocably mounted in said cylinder between said piston and said end, said plate being equipped with a guide member extending through said piston, and an arm pivotally mounted in said engine for contact with said guide member only during the upward movement of said plate, said arm being disengaged from said guide member during the power stroke of said piston, said arm being responsive to the position of said crankshaft for contacting said guide member.

2. In an internal combustion engine having a two-stroke cycle, a piston-equipped cylinder having an exhaust valve at one end and an intake port in the cylinder side wall spaced from said one end, a plate-like piston in said cylinder between the first-mentioned piston and said one end, passage means in said cylinder for flowing gas from one side to the other of said plate-like piston when said plate-like piston is positioned adjacent said one end, a crankshaft connected to said first-mentioned piston, said plate-like piston being equipped with a projection extending through said first-mentioned piston, said crankshaft being equipped with an arm intermittently engageable with said projection, said arm being positioned by said crankshaft out of contact with said projection during the power stroke of said first-mentioned piston.

References Cited in the file of this patent

UNITED STATES PATENTS

| | | |
|---|---|---|
| 735,964 | Gile | Aug. 11, 1903 |
| 1,220,095 | Gray | Mar. 20, 1917 |
| 1,335,324 | Gile | Mar. 30, 1920 |
| 1,440,150 | Hutchinson | Dec. 26, 1922 |
| 1,613,990 | Gerau | Jan. 11, 1927 |
| 1,852,890 | MacFarlane | Apr. 5, 1932 |